Jan. 29, 1935. F. SHENTON 1,989,341
ELECTRICALLY OPERATED VALVE
Filed Dec. 10, 1932 2 Sheets-Sheet 1
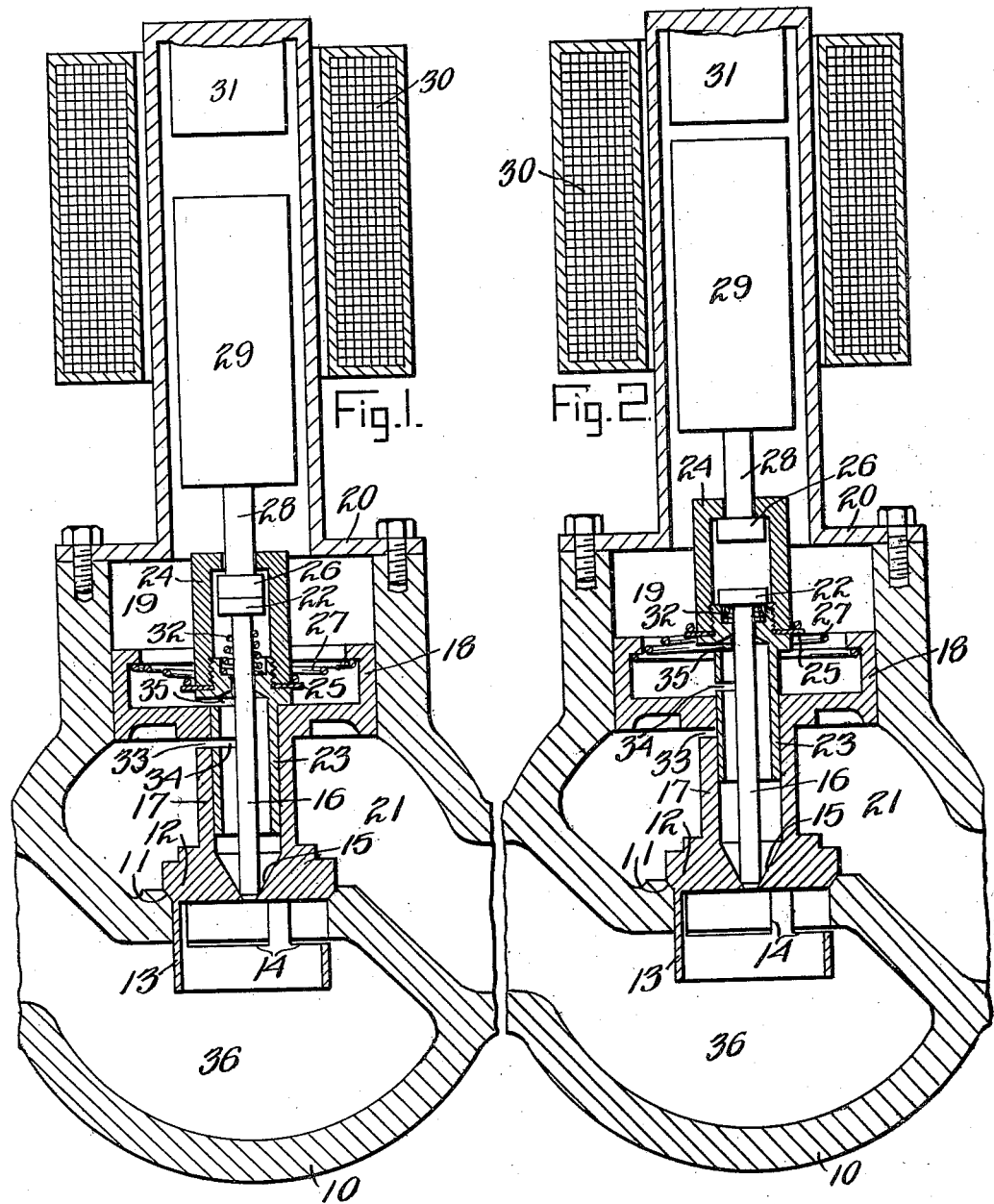
Inventor
Francis Shenton

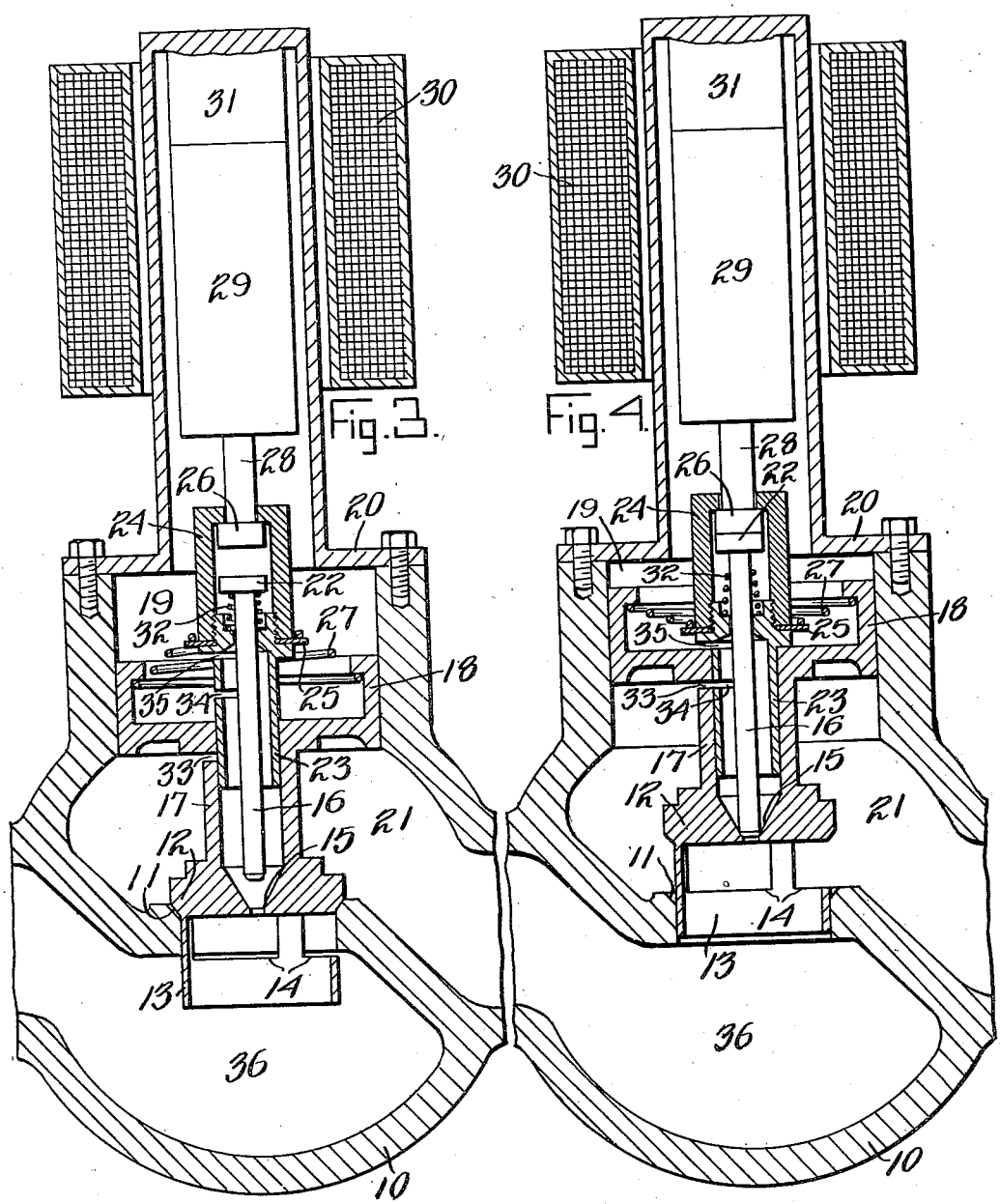

Patented Jan. 29, 1935

1,989,341

UNITED STATES PATENT OFFICE 1,989,341

ELECTRICALLY OPERATED VALVE

Francis Shenton, Waynesboro, Pa., assignor to Frick Company, Waynesboro, Pa., a corporation of Pennsylvania Application December 10, 1932, Serial No. 646,679

3 Claims. (Cl. 137—139)

This invention relates to electrically operated valves and an object is to provide means for easily operating valves against relatively high pressure.

A further object is to provide an improved valve having means for effecting a quick or snappy action so that the valve will be substantially instantly opened with little expenditure of energy when current is applied and instantly closed when the current is cut-off.

Other objects and advantages will become apparent as the description proceeds.

Referring to the accompanying drawings which are made a part hereof and on which similar reference characters indicate similar parts, Figure 1 is an elevation in section showing the valve closed and the operating coils de-energized, Figure 2, a similar elevation in section with the valve closed but with the coil energized and some of the parts moved slightly from the position shown in Figure 1, Figure 3, a similar elevation in section showing the valve closed, with the coil energized and with a pilot valve open, and Figure 4, a similar elevation in section showing the coil energized and the valve in its final open position.

In the drawings reference character 10 indicates a valve casing having a valve seat 11 for receiving a valve 12. The valve 12 has a depending guide 13 which is provided with slots 14 to permit the passage of fluid through the valve. The valve 12 has a valve seat 15 for an auxiliary valve 16. The valve 12 has a hollow body portion 17 which carries upon its upper end a piston 18 which operates in a cylindrical chamber 19, the upper portion of which may be closed by a cover 20. The piston 18 divides the high pressure chamber 21 from the chamber 19 which is above the piston. Slidable within the stem 17 is a sleeve valve 23. The valve 23 is secured to and preferably threaded into the lower end of a hollow nut 24. A washer 25 somewhat larger than the nut 24 is confined between the valve 23 and the nut 24. The valve 16 carries a head 22 within the hollow nut 24. A spring 27 has its lower end positioned upon the rim of the washer 25 and its upper end engaging beneath an inwardly extending flange on the piston 18. The end of the stem of auxiliary valve 16 abuts the head 26 of a stem 28 which is attached to a plunger 29. Surrounding the upper portion of the cover cap 20 is an energizing coil 30 for operating the plunger 29. A stop 31 limits upward movement of the plunger. When the plunger 29 is raised the end 26 engages the upper inner end of the nut 24 to raise it. When the nut is raised it first compresses a spring 32. The neck portion 17 of the valve 12 has a port 33 which provides communication from the high pressure chamber through a port 34 with a chamber within the sleeve valve 23. The sleeve valve has a port 35 which communicates with the high pressure chamber 19 above the piston 18. When the valve 12 is open high pressure fluid from the chamber 21 flows through the valve to low pressure chamber 36.

In operation, assuming that the valve is at ease as shown in Figure 1, at this time the coil 30 is deenergized so the parts will rest in the position shown. When the coil 30 is energized the plunger 29 is first raised to the position shown in Figure 2. By means of the end 26 sleeve valve 23 is moved up to cut off the port 33 from providing communication between high pressure chamber 21 and the chamber within the sleeve valve. The spring 27 moreover is flexed from the position shown in Figure 1 upwardly to the position shown in Figure 2. Moreover the spring 32 is put under tension between the head 22 and the upper end of the sleeve valve 23. The plunger 29 has not yet reached the upward limit of its movement. The next movement carries the plunger 29 to the position shown in Figure 3. This upward movement puts the spring 132 under added tension until with a snap action it lifts the auxiliary valve 16 from its valve seat 15 and provides communication through the port 35 between high pressure chamber 19 and low pressure chamber 36 through the valve seat 15. Pressure is therefore relieved above the piston 18. High pressure in the chamber 21 therefore operating against the under side of the piston 18 will quickly raise this piston to lift the valve 12 from its seat 11 and provide open communication from high pressure chamber 21 through the valve into the chamber 36. This is the position shown in Figure 4. As the piston 18 moves up the spring 27 is again flexed to the lower position shown in Figure 4. High pressure chamber 19 and high pressure chamber 21 are again in communication through the port 33. So long as the coil 30 is energized the valve may remain open in the position shown in Figure 4. As soon as the coil is de-energized the valve will close by gravity since pressure on both sides of the piston 18 are the same.

From the description given it should be apparent that the valve can be opened with very little energy since there are no high pressures operating against movable parts at the outset of the opening of the valve. The sleeve valve 23 is free to move without operating against any opposing pressures. The auxiliary valve 16 is a very small valve and may be easily lifted from valve seat 15. When this is done the high pressure from chamber 21 instead of preventing opening of the valve is utilized to cause its opening.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A valve assembly comprising a casing having a partition wall therein for dividing it into high pressure and low pressure areas, a valve seat in the partition, a valve movable to engage said seat, a chamber having a piston mounted therein, said piston having a hollow stem connecting it to the said valve, a port in said stem for equalizing pressures on both sides of said piston, a slide valve in said stem for closing said port, an auxiliary valve positioned within said stem for closing a port through said valve, said auxiliary valve being operable by said slide valve, electrical means for operating said slide valve, and a spring attached to said slide valve and to said piston, movement of the slide valve serving to bias the piston in the same direction, substantially as set forth.

2. A valve assembly comprising a casing having a partition wall therein for dividing it into high pressure and low pressure areas, a valve seat in the partition, a valve movable to engage said seat, a chamber having a piston mounted therein, said piston having a hollow stem connecting it to the said valve, a port in said stem for equalizing pressures on both sides of said piston, a slide valve in said stem for closing said port, an auxiliary valve positioned within said stem for closing a port through said valve, said auxiliary valve being operable by said slide valve, electrical means for opening said slide valve, and a spring attached to said slide valve and to said piston, movement of the slide valve serving to bias the piston in the same direction, and an additional spring engageable with said slide valve and said auxiliary valve for imparting snap action movement to said auxiliary valve when said slide valve has been moved a predetermined distance, substantially as set forth.

3. A valve assembly comprising a casing having a partition wall therein for dividing it into high pressure and low pressure areas, a valve seat in the partition, a valve movable to engage said seat, a chamber in said high pressure area, a piston mounted in said chamber and having a hollow stem connecting it to the said valve, a port in said stem below said piston for equalizing the pressure on both sides of said piston, a slide valve in said stem for closing said port, an auxiliary valve positioned within said stem for closing a port through said valve, said auxiliary valve being operable by said slide valve, electrical means for opening said slide valve, a spiral spring attached to said slide valve and to said piston, movement of the slide valve serving to force the piston in the same direction, and an additional spring engageable with said slide valve and said auxiliary valve for imparting snap action movement to said auxiliary valve when said slide valve has been moved to a predetermined distance.

FRANCIS SHENTON.